United States Patent
Gieger

(10) Patent No.: US 10,819,086 B2
(45) Date of Patent: Oct. 27, 2020

(54) MULTI-POINT WELL JUNCTION

(71) Applicant: ABB Schweiz AG, Baden (CH)

(72) Inventor: Jeffrey Gieger, Dingmans Ferry, PA (US)

(73) Assignee: ABB Schweiz AG, Baden (CH)

( * ) Notice: Subject to any disclaimer, the term of this patent is extended or adjusted under 35 U.S.C. 154(b) by 79 days.

(21) Appl. No.: 16/158,920

(22) Filed: Oct. 12, 2018

(65) Prior Publication Data

US 2020/0119530 A1 Apr. 16, 2020

(51) Int. Cl.
*H02B 1/20* (2006.01)
*H02B 1/30* (2006.01)

(52) U.S. Cl.
CPC ............... *H02B 1/20* (2013.01); *H02B 1/30* (2013.01)

(58) Field of Classification Search
CPC .................................... H02B 1/20; H02B 1/30
See application file for complete search history.

(56) References Cited

U.S. PATENT DOCUMENTS

| 7,081,027 | B2* | 7/2006 | Woodward | H01R 9/24 174/86 |
| 8,647,159 | B2* | 2/2014 | Steeves | H01R 4/305 439/798 |
| 9,651,174 | B2* | 5/2017 | Lechuga | E04C 2/52 |
| 2002/0016086 | A1* | 2/2002 | Kinsey | H01R 27/02 439/34 |
| 2008/0026645 | A1* | 1/2008 | Naufel | H01R 4/305 439/798 |

* cited by examiner

*Primary Examiner* — Abdullah A Riyami
*Assistant Examiner* — Nader J Alhawamdeh
(74) *Attorney, Agent, or Firm* — Taft Stettinius & Hollister LLP; J. Bruce Schelkopf

(57) ABSTRACT

A multi-joint junction having a plurality of selectively adaptable female well interfaces. Each of the well interfaces can have a generally uniform shape, size, and/or configuration such that each well interface is configured to generally interchangeably receive the same sized and/or shaped mating male connector or contact interface. The interfaces of the multi-joint junction can also be limited to female contact interfaces, and not include any male connectors or contact interfaces. Such a configuration can provide a degree of modularity that can improve the ease with which the multi-point junction can be adapted to conform to different demands, applications and/or system configurations.

20 Claims, 2 Drawing Sheets

FIG. 1B

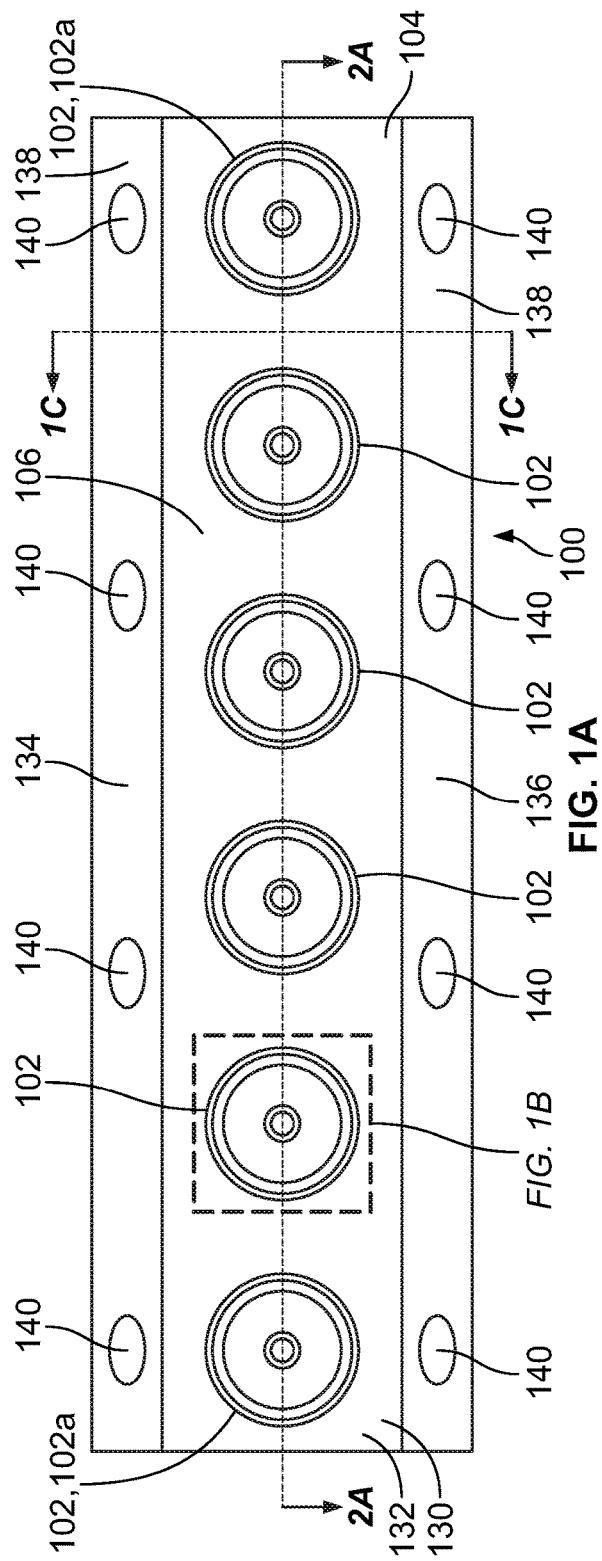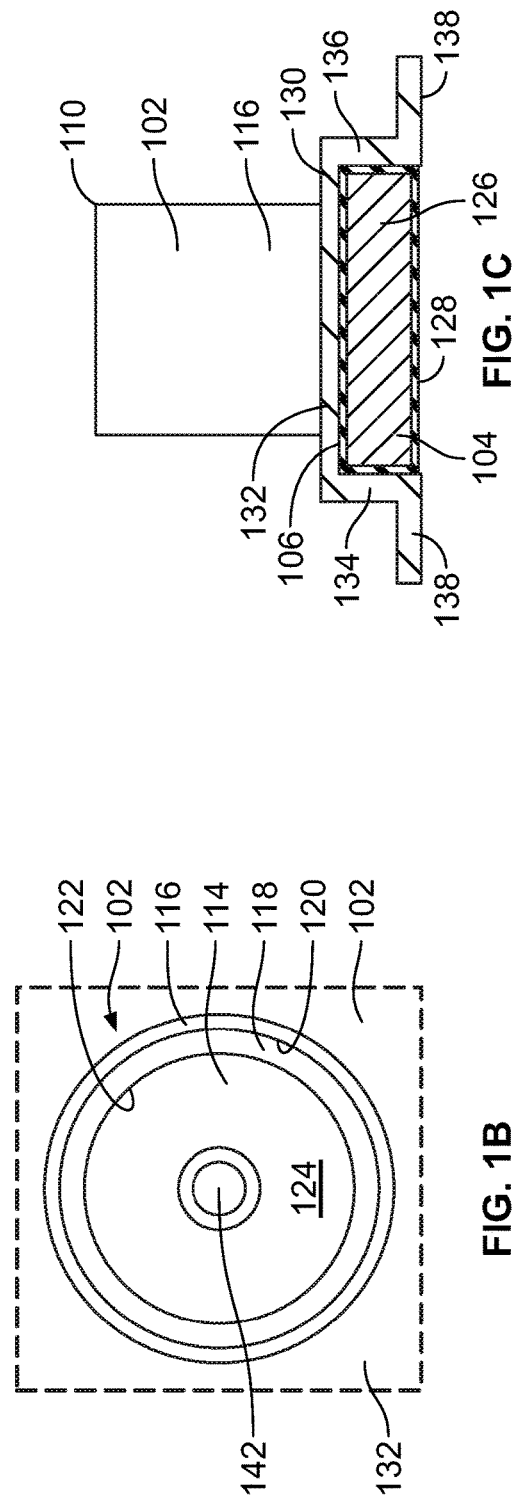

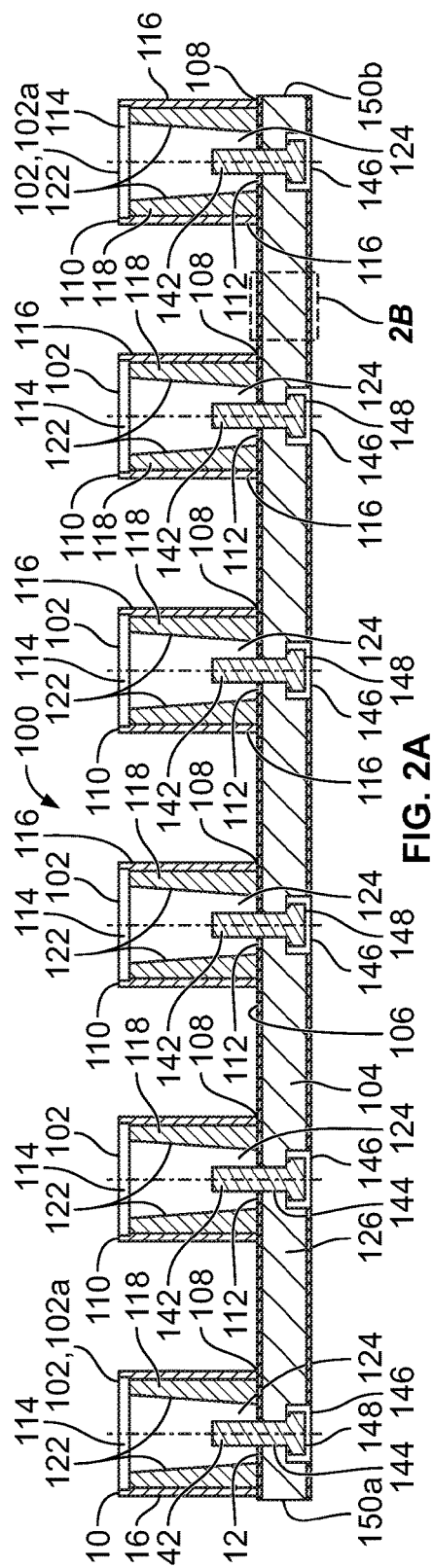
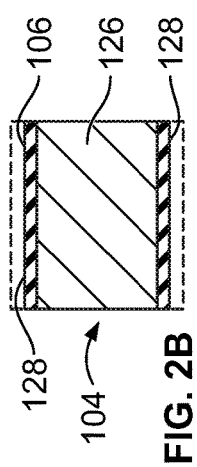
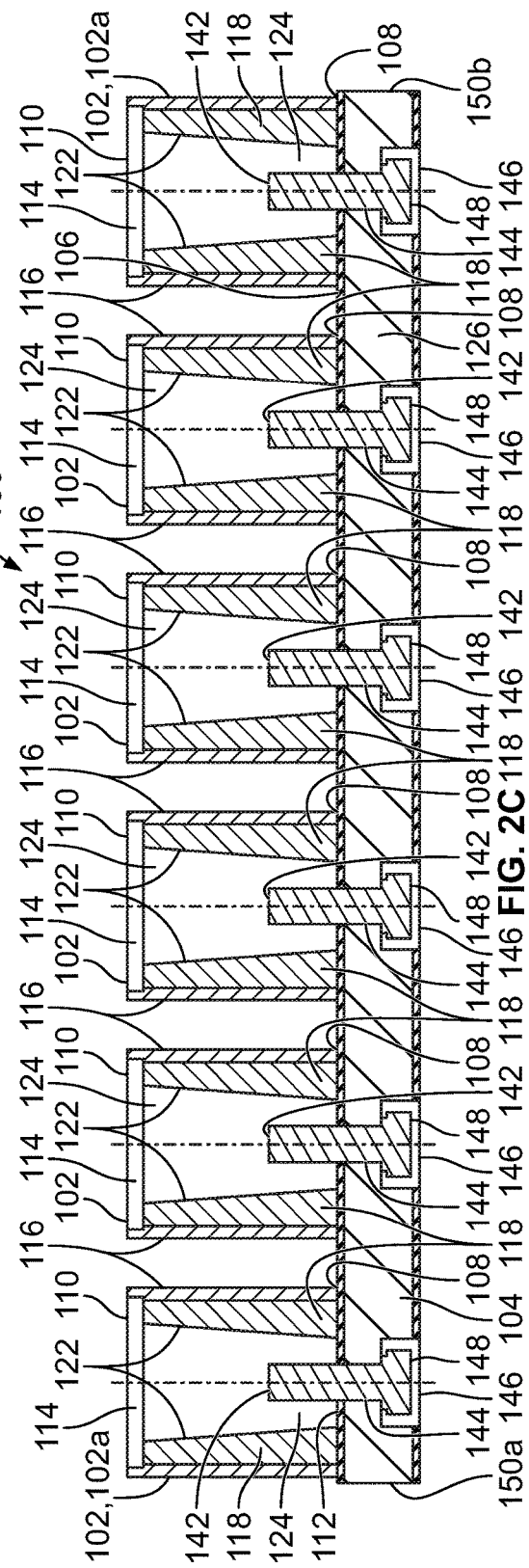
FIG. 2A
FIG. 2B
FIG. 2C

MULTI-POINT WELL JUNCTION

BACKGROUND

Embodiments of the present application generally relate to an electrical interface. More particularly, but not exclusively, embodiments of the present application relate to a multi-joint junction having a plurality of selectively adaptable female well interfaces.

Electronic components associated with power distribution can be located and housed in a variety of different locations. For example, in at least urban locations, electrical components associated with power distribution from electrical utility sources and/or grids can be housed within underground vault channels and/or other confined spaces, among other locations. Such equipment includes, but is not limited to, transformers and switching apparatuses, among other electrical components and devices. Given the limited space available in such confined locations, attempts are often made to minimize the size and/or footprint of the devices and components that are housed at those locations.

One manner of attempting to conserve limited space in underground vault channels, among other confined areas that house electrical equipment used in the delivery and/or transmission electrical power, is through the use of multi-point junctions. Typically, multi-point junctions are built based on the particular demands of the customer, and often include a variety of different sized and/or rated male connectors or interfaces. Further, the number of such male connectors or interfaces on multi-point junctions can vary for different applications. Yet, different customers and/or applications can require a variety of different multi-point junction configurations. Thus, in order to satisfy the needs and/or equipment demands of a particular location, manufactures and distributors may need to build and/or store a relatively large number of different configurations of multi-point junctions, as well as the associated variety of components for the different multi-point junctions. Yet, the ability to accommodate such a wide variety of multi-point junction configurations can increase manufacturing and inventory costs, which can result in an increase in costs to consumers.

BRIEF SUMMARY

An aspect of an embodiment of the present application is a multi-point junction comprising a base plate having a bus bar and a plurality of well interfaces that can be electrically coupled to the bus bar. The plurality of well interfaces can comprise an outer jacket, an insulative jacket, and a well stud, the insulative jacket for each of the plurality of well interfaces defining a female contact interface of the well interface. Further, the female contact interface can define at least a portion of an inner cavity of the well interface. The well stud can be electrically coupled to the bus bar, and at least a portion of the well stud can project into the inner cavity. Additionally, the multi-point junction may not have any male electrical contact interfaces that extend from the base plate.

Another aspect of an embodiment of the present application is a multi-point junction that includes a plurality of well interfaces, each well interface of the plurality of well interfaces extending from a first end to a second end of the well interface. Each well interface can also include an insulative jacket housed within an outer jacket, an inner wall of the insulative jacket defining a cavity of the well interface. Additionally, the inner wall of the insulative jacket can be outwardly tapered from around the first end to around the second end of the well interface. The multi-point junction can also include a base plate that can be coupled to the first end of each of the well interfaces. The base plate can include a bus bar that is at least partially encased in an outer insulative layer of the base plate. The bus bar can be electrically coupled to a well stud of each of the plurality of well interfaces. Further, the plurality of well interfaces can comprises one of either two female well interfaces, or six female well interfaces. Additionally, the multi-point junction may not include a male contact interface that is electrically coupled to the bus bar.

Additionally, an aspect of an embodiment of the present application is a multi-point junction comprising a base plate having a bus bar that is constructed from an electrically conductive material. At least a portion of the bus bar can be encased in an insulative layer. Further, the base plate can have a plurality of orifices that extend through at least the bus bar, and the plurality of orifices can each include a counter bore. The multi-point junction can also include a plurality of female well interfaces. Each female well interface of the plurality of female well interfaces can have a first end and a second end, the first end being coupled to an upper portion of the bus bar. Additionally, each female well interface can further include an outer jacket, an insulative jacket, and a well stud, the insulative jacket being housed within the outer jacket and is shaped and positioned to provide a female contact interface of the female well interface. A threaded portion of the well stud can be sized to extend through the orifice and into the female well interface. Further, the well stud can include a head sized to be received in the counter bore. Further, the multi-point junction may not include any connectors having a male electrical contact interface that extend from the upper portion of the bus bar.

BRIEF DESCRIPTION OF THE DRAWINGS

The description herein makes reference to the accompanying figures wherein like reference numerals refer to like parts throughout the several views.

FIG. 1A illustrates a top view of an exemplary multi-point junction according to an illustrated embodiment of the subject application.

FIG. 1B illustrates a top side view an exemplary junction well interface of the multi-point junction shown in FIG. 1A.

FIG. 1C illustrates a cross sectional side view of the exemplary multi-point junction taken along line B-B in FIG. 1A.

FIG. 2A illustrates a cross sectional side view of the exemplary multi-point junction taken along line A-A in FIG. 1A.

FIG. 2B illustrates a magnified cross sectional side view of a portion of the base plate of the multi-point junction depicted in FIG. 2A.

FIG. 2C illustrates a cross sectional side view of an alternative exemplary multi-point junction according to an illustrated embodiment of the subject application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIG. 1A illustrates a top view of an exemplary multi-point junction 100 according to an illustrated embodiment of the subject application. The multi-point junction 100 includes two or more female junction well interfaces 102 that are coupled to, or otherwise extend from, a base plate 104 (FIG. 1C) of the multi-point junction 100. While the exemplary multi-point junction 100 illustrated in FIG. 1 is a six-point junction that has six junction well interfaces 102, the number of female well interfaces 102, and thus the number of junction points, can vary for different applications. For example, according to certain embodiments, the multi-point junction 100 can be configured to have two to six well interfaces 102.

Additionally, according to the illustrated embodiments, the plurality of well interfaces 102 of the multi-point junction 100 are each female contact interfaces that are configured to receive a mating male connector and/or accessory. According to certain embodiments, each of the well interfaces 102 have a generally uniform shape, size, and/or configuration so that each well interface 102 is configured to generally interchangeably receive the same sized and/or shaped mating male connector or interface. Additionally, as shown in at least FIG. 1A, according to certain embodiments, the interfaces 102 can be limited to female contact interfaces, and do not include any male connectors or interfaces. Moreover, as illustrated, the multi-point junction 100 does not include any male electrical connectors extending from the base plate 104, including, for example, any male loadbreak bushings, among other types of male electrical connectors or interfaces. For example, according to certain embodiments, the well interfaces 102 for the exemplary multi-point junction 100 are solely 600 Amp wells. Additionally, while each of the well interfaces 102 can be coupled to a male connector or interface that is associated with a variety of different types of electrical devices, components, and/or accessories, according to the illustrated embodiment, one of the plurality of well interfaces 102 is coupled to a male connector that is coupled to a power source that can provide electrical power to the multi-point junction 100, and thus power that is distributed via at least one or more components of the base plate 104 to at least the other well interfaces 102.

Each of the well interfaces 102 can outwardly extend from an upper surface 106 (FIGS. 2A and 2C) of the base plate 104 from a first end 108 to a second end 110 of the well interface 102. According to the illustrated embodiment, at least the outer portion of the well interfaces 102 can have, for example, a generally cylindrical shape, among other shapes. Additionally, the well interfaces 102 can each include a first opening 112 at the first end 108, and a second opening 114 at the second end 110, of the well interface 102. Further, the first end 108 of the well interface 102 can be coupled to the base plate 104 in a variety of different manners. For example, according to certain embodiments, the first end 108 of the well interface 102 can be coupled to the base plate 104 via one or more mechanical fasteners, including, but not limited to, a bolt, screw, and/or pin, an interference or compression fit, an adhesive, and/or a combination thereof, among other manners of securely coupling the first end 108 of each of the well interfaces 102 to the base plate 104.

As shown by at least FIG. 1B, each well interface 102 can include an outer jacket 116 and an inner insulative jacket 118. The outer jacket 116 can be formed or molded from a variety of different types of materials, including, for example, a conductive (or semi-conductive) peroxide-cured synthetic rubber, commonly referred to as EPDM (ethylene-propylene-dienemonomer), among other materials. An inner wall 120 of the outer jacket 116 can define an area in which at least a portion of the insulative jacket 118 is housed within the well interface 102. Additionally, an inner wall 122 of the insulative jacket 118 can define at least a portion of a cavity 124 of the well interface 102, and be shaped to provide a female contact interface that is shaped and positioned to generally mate and/or confirm to the configuration of a mating male connector or interface. For example, according to certain embodiments, the inner wall 122 of the insulative jacket 118 may be outwardly tapered from the first end 108 to the second end 110 of the well interface 102 such that the inner configuration of the female contact interface of the well interface 102 corresponds to the mating taper of a male interface of a loadbreak bushing. According to such an embodiment, the degree and length of taper of the inner wall 122 of the insulative jacket 118 can be based on a variety of different considerations, including, but not limited to, the configuration of the mating exterior portion of the loadbreak bushing and/or power line that will be inserted into the into the cavity 124 through the second opening 114 of the well interface 102, and/or one or more associated industry, manufacturer, and/or customer standards, including, but not limited to, one or more standards as set forth by the American National Standards Institute (ANSI). Further, the insulative jacket 118 can be formed or molded from a variety of types of insulating materials, including, but not limited to, rubber, synthetic rubber, plastic, and/or EPDM, among other materials.

The base plate 104 can be constructed form a variety of different materials. For example, as shown in at least FIG. 2B, the base plate 104 can comprise a bus bar 126 that is constructed from an electrically conductive base material, such as, for example, copper, brass, or aluminum, among other materials. Additionally, the base plate 104 can include an outer insulative layer 128 that comprises an electrical insulative material, such as, for example, rubber, among other materials. According to certain embodiments, the outer insulative layer 128 of the base plate 104 can be applied to the bus bar 126 such that the outer insulative layer 128 coats and/or encases at least a portion of the bus bar 126 within the insulative layer 128.

Additionally, or optionally, as shown in FIGS. 1A and 1C, according to certain embodiments, the base plate 104 can be housed within an outer housing 130 that can be configured to prevent accidental contact with the base plate 104 and/or bus bar 126. The outer housing 130 can be constructed from a generally electrically non-conductive and/or insulative material. According to certain embodiments, the outer housing 130 includes an upper plate 132, a first flange 134, and a second flange 136. The first and second flanges 134, 136 can be coupled to opposing sides of the upper plate 132.

Further, according to certain embodiments, the first and second flanges 134, 136 can have generally "L" shaped configuration such that a flange plate 138 of the first and second flanges 134, 136 is positioned below, or offset from, the upper plate 132. The configuration of the first and second flanges 134, 136 can be designed to prevent accidental contact with at least side portions of the base plate 104 and/or sides of the bus bar 126.

One or both of the first and second flanges 134, 136 can include an attachment member 140 that is configured to secure the multi-point junction 100 to another structure, component, and/or wall. For example, according to the embodiment depicted in FIG. 1, the attachment member 140 can comprise a plurality of through holes that extend through the first flange 134 and/or the second flange 136 that are sized to receive a mechanical fastener, such as, for example, a bolt, screw, pin, and/or hook, among other fasteners, that are used to generally secure the multi-point junction 100 to another structure. Alternatively, the attachment member 140 can be a mechanical fastener, such as, for example, a bolt, screw, pin, or nut, among other types of mechanical fasteners.

Each well interface 102 can also include a well stud 142 that can threadingly engage a mating fastener or bolt of the male electrical component that will be inserted into the cavity 124. For example, according to certain embodiments, the well stud 142 can include an external or internal thread that mates with a corresponding internal or external thread of the male electrical component or interface that will be electrically coupled to the well interface 102. More specifically, according to certain embodiments, the well stud 142 of at least some of the well interfaces 102 includes an external thread that mates an internal thread of a bushing bolt of a male loadbreak bushing. The well stud 142 can be constructed from an electrically conductive material such that electrical power can be communicated from the bus bar 126 through at least the well stud 142 and to the associated male electrical component, device, or accessory, or vice versa, that is coupled to the well stud 142.

As shown by a least FIG. 2A, the base plate 104 can include at least one orifice 144 that extends through the base plate 104, and moreover, through the bus bar 126, that is configured to both accommodate passage of the well stud 142 through the bus bar 126, as well as provide an interface for the well stud 142 to be in electrical communication with the bus bar 126. According to certain embodiments, the orifice 144 can have an internal thread that is configured for mating engagement with the external thread of the well stud 142. Additionally, the bus bar 126 can also include a counter bore 146 that is sized to receive recessed placement of at least a portion, if not all, of a head 148 of the well stud 142 within the bus bar 126. According to certain embodiments, such a configuration may allow a surface of the head 148 of the well stud 142 to directly or indirectly abut, and thus be in electrical communication with, an adjacent surface of the bus bar 126. For example, according to certain embodiments, an electrically conductive washer or spacer can be positioned inbetween, and electrically coupled to both, the bus bar 126 and the head 148 of the well stud 142.

According to certain embodiments, the well stud 142 can also be coupled to the well interface 102. For example, according to certain embodiments, the first opening 112 at the first end 108 of the well interface 102 can include an internal thread that mates the external thread of the well stud 142. Alternatively, according to certain embodiments, the well interface 102 can include a nut or other mating connector or fastener that can securely engage the well stud 142.

Yet, according to other embodiments, the well stud 142 can project through the first opening 112 and into the cavity 124 without being directly fastened to the well interface 102, and instead be only securely coupled to the base plate 104 prior to mating engagement with a male connector or interface that is received with in the cavity 124 of the well interface 102.

In addition to being configured to have a variety of different number of well interfaces 102, the well interfaces 102 and/or associated well studs 142 can be separated at a variety of different distances from neighboring well interfaces 102 and/or associated well studs 142. For example, FIG. 2A illustrates an exemplary multi-point junction 100 having six well interfaces 102 that are spaced apart such that the center line(s) of the well interfaces 102 and/or associated well studs 142 are approximately six and one-half inches (6.5 inches) apart. According to the illustrated embodiment, the female well interfaces 102a, 102b at opposing ends of the multi-point junction 100 are, or are almost, flush with the adjacent end 150a, 150b of the base plate 104. However, according to other embodiments, the end female well interfaces 102a, 102b can be inwardly offset by a greater distance from adjacent ends 150a, 150b of the base plate 104, as shown, for example, by FIG. 1A. FIG. 2C illustrates a multi-point junction 100' that is similar to that depicted in FIG. 2A with the exception that the center line(s) of the well interfaces 102 and/or associated well studs 142 are approximately four inches (4 inches) apart. Thus, according to the exemplary embodiment depicted in FIG. 2C, as the end female well interfaces 102a, 102b are, or are almost, flush with the adjacent end 150a, 150b of the base plate 104, the overall linear length of the base plate 104 for the embodiment depicted in FIG. 2C is shorter than that depicted in FIG. 2A.

With each of the well interfaces 102 being female contact interfaces, the construction of the multi-point junction 100, 100' can be simplified while also providing a degree of modularity that can improve the ease with which the multi-point junction 100, 100' can be adapted to conform to the different demands of different applications and/or different end users. For example, according to the illustrated embodiment, adapters can be available that can interchangeably mate with any one of the well interfaces 102 of the multi-point junction 100, 100'. For example, upon providing a multi-point junction 100, 100', interface adapters can be made available that fit into any of the interface wells 106. Such adapters can include, but are not limited to, adapters to provide a lower amperage connection, such as, for example, a well adapter that can reduce a 600 amp well interface 102 to a 200 amp interface at the well adapter. Additionally, interface adapters that can matingly engage the interface wells 106 can also include 15 kilovolt (kV) and 25 kV loadbreak interfaces, as well as both male and female 600 amp interfaces.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A multi-point junction comprising:
a base plate having a bus bar; and
a plurality of well interfaces electrically coupled to the bus bar, the plurality of well interfaces comprising an outer jacket, an insulative jacket, and a well stud, the outer jacket being disposed about the insulative jacket, the insulative jacket for each of the plurality of well interfaces defining a female contact interface, the female contact interface defining at least a portion of an inner cavity of the well interface, the well stud being electrically coupled to the bus bar, at least a portion of the well stud projecting into the inner cavity,
wherein the multi-point junction does not include a male electrical contact interfaces that extend from the base plate.

2. The multi-point junction of claim 1, wherein the base plate further includes an outer insulative layer that encases at least a portion of the bus bar.

3. The multi-point junction of claim 2, wherein the outer insulative layer comprises rubber.

4. The multi-point junction of claim 1, further including an outer housing that houses at least a portion of the base plate, and wherein at least a portion of each of the plurality of well interfaces extend directly above an upper plate of the outer housing.

5. A multi-point junction comprising:
a base plate having a bus bar; and
a plurality of well interfaces electrically coupled to the bus bar, the plurality of well interfaces comprising an outer jacket, an insulative jacket, and a well stud, the insulative jacket for each of the plurality of well interfaces defining a female contact interface, the female contact interface defining at least a portion of an inner cavity of the well interface, the well stud being electrically coupled to the bus bar, at least a portion of the well stud projecting into the inner cavity; and
an outer housing that houses at least a portion of the base plate, wherein at least a portion of each of the plurality of well interfaces extend directly above an upper plate of the outer housing,
wherein the multi-point junction does not include a male electrical contact interfaces that extend from the base plate,
wherein the outer housing includes a first flange and a second flange, the first and second flanges being on opposing sides of the upper plate, and wherein at least one of the first and second flanges includes an attachment member.

6. The multi-point junction of claim 1, wherein the plurality of well interfaces comprises two female well interfaces.

7. The multi-point junction of claim 1, wherein the plurality of well interfaces comprises six female well interfaces.

8. The multi-point junction of claim 1, wherein a centerline of each of the plurality of well interfaces is separated from a centerline of each adjacent well interface of the plurality of well interfaces by a linear distance of around six and one-half inches.

9. The multi-point junction of claim 1, wherein a centerline of each of the plurality of well interfaces is separated from a centerline of each adjacent well interface of the plurality of well interfaces by a linear distance of around four inches.

10. A multi-point junction comprising:
a plurality of well interfaces, each well interface of the plurality of well interfaces extending from a first end to a second end of the well interface and including an insulative jacket housed within an outer jacket, an inner wall of the insulative jacket defining a cavity of the well interface, wherein the inner wall is outwardly tapered from around the first end to around the second end of the well interface;
a base plate coupled to the first end of each of the well interfaces, the base plate including a bus bar that is at least partially encased in an outer insulative layer of the base plate, the bus bar being electrically coupled to a well stud of each of the plurality of well interfaces,
wherein the plurality of well interfaces comprises one of either (a) two female well interfaces, or (b) six female well interfaces, and
wherein the multi-point junction does not include a male contact interface that is electrically coupled to the bus bar.

11. The multi-point junction of claim 10, wherein the outer insulative layer comprises rubber.

12. The multi-point junction of claim 10, further including an outer housing that houses at least a portion of the base plate, and wherein at least a portion of each of the plurality of well interfaces extend directly above an upper plate of the outer housing.

13. The multi-point junction of claim 12, wherein the outer housing includes a first flange and a second flange, the first and second flanges being on opposing sides of the upper plate, and wherein at least one of the first and second flanges includes an attachment member.

14. The multi-point junction of claim 12, wherein a centerline of each of the plurality of well interfaces is separated from a centerline of each adjacent well interface of the plurality of well interfaces by a linear distance of around six and one-half inches.

15. The multi-point junction of claim 12, wherein a centerline of each of the plurality of well interfaces is separated from a centerline of each adjacent well interface of the plurality of well interfaces by a linear distance of around four inches.

16. A multi-point junction comprising:
a base plate comprising a bus bar constructed from an electrically conductive material, at least a portion of the bus bar being encased in an insulative layer, the base plate having a plurality of orifices that extend through at least the bus bar, the plurality of orifices including a counter bore;
a plurality of female well interfaces, each female well interface of the plurality of female well interfaces having a first end and a second end, the first end being coupled to an upper portion of the bus bar, each female well interface further including an outer jacket, an insulative jacket, and a well stud, the insulative jacket housed within the outer jacket and shaped and positioned to provide a female contact interface of the female well interface, a threaded portion of the well stud sized to extend through the orifice and into the female well interface, the well stud including a head sized to be received in the counter bore, wherein the multi-point junction does not include any connectors having a male electrical contact interface that extends from the upper portion of the bus bar.

17. The multi-point junction of claim 16, wherein the female contact interface for each female well interface of the plurality of female well interfaces includes a portion of an inner wall of the insulative jacket that is outwardly tapered between the first end and the second end of the female well interface.

18. The multi-point junction of claim 17, further including an outer housing that houses at least a portion of the base plate, each of the plurality of well female interfaces extend directly above an upper plate of the outer housing, the outer housing including at least one flange that is offset from the upper plate and which includes an attachment member for coupling the multi-point junction to another structure.

19. The multi-point junction of claim 18, wherein the plurality of female well interfaces comprises one of either two female well interfaces or six female well interfaces.

20. The multi-point junction of claim 19, wherein a centerline of each of the plurality of female well interfaces is separated from a centerline of each adjacent female well interface of the plurality of female well interfaces either by a linear distance of around either four inches or six and one-half inches.

* * * * *